(12) United States Patent
Bartlett (10) Patent No.: US 7,167,332 B2
(45) Date of Patent: Jan. 23, 2007

(54) METHOD AND APPARATUS FOR RECORDING DATA ONTO A RECORDING MEDIUM INCLUDING WARNING OF THE APPROACH TO AN END OF MEDIUM POSITION

(75) Inventor: Paul Frederick Bartlett, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/117,174

(22) Filed: Apr. 28, 2005

(65) Prior Publication Data

US 2005/0248869 A1 Nov. 10, 2005

(30) Foreign Application Priority Data

Apr. 30, 2004 (GB) .................. 0409643.4

(51) Int. Cl.
G11B 15/48 (2006.01)
G11B 15/18 (2006.01)
(52) U.S. Cl. .................. 360/74.4; 360/72.2; 360/15
(58) Field of Classification Search .................. None
See application file for complete search history.

(56) References Cited

U.S. PATENT DOCUMENTS 3,779,483 A 12/1973 Inoue
4,044,233 A 8/1977 Sato
6,101,070 A * 8/2000 Oguro .................. 360/132
6,257,515 B1 * 7/2001 Fukuda et al. ........... 242/333.7
6,459,541 B1 10/2002 Minabe et al.

FOREIGN PATENT DOCUMENTS

WO WO 88/02539 4/1988

OTHER PUBLICATIONS

ECMA-329 8 mm Wide Magnetic Tape Cartridge for Information Interchange—Helical Scan Recording—AIT-3 Format Section 11, Sec. 16.10, Dec. 2001.
ECMA-288 3, 81 mm Wide Magnetic Tape Cartridge for Information Interchange—Helichal Scan Recording—DDS-4 Format Section 11, Section 16.8, Jun. 1999.

* cited by examiner

*Primary Examiner*—Andrew L. Sniezek (57) ABSTRACT

Briefly described, one embodiment of a method of recording data in a sequence of data sets onto a data recording medium having a recording capacity up to an end of medium position includes the following steps: deriving a logical count of the amount of data recorded on the recording medium, and comparing the logical count to a reference value to generate a warning of an approach to the end of medium position. Other methods and systems are also provided.

22 Claims, 7 Drawing Sheets

METHOD AND APPARATUS FOR RECORDING DATA ONTO A RECORDING MEDIUM INCLUDING WARNING OF THE APPROACH TO AN END OF MEDIUM POSITION

CLAIM TO PRIORITY

This application claims priority to copending United Kingdom utility application entitled, "Method and Apparatus for Recording Data onto a Recording Medium Including Warning of the Approach to an End of Medium Position," having serial number GB 0409643.4, filed Apr. 30, 2004, which is entirely incorporated herein by reference.

TECHNICAL

The present disclosure relates to a method and apparatus for recording a sequence of data onto a recording medium having a recording capacity up to an end of medium position, and more specifically to providing a warning of the approach to the end of medium position.

BACKGROUND

In order to store digital electronic data, it is known to use magnetic tape data storage cartridges which are inserted into a tape drive unit having magnetic recording and reproducing heads. Typically such magnetic storage devices are used for recording back-up data generated by a host computer programmed to control the data recording process.

In recording a sequence of data sets onto a magnetic data recording medium such as the tape in a tape cartridge, it is conventional to provide the host computer with an early warning of the end of the recording medium (EWEOM). The position of the EWEOM has to be chosen judiciously so as to avoid writing data beyond the capacity provided by the recording medium and yet avoid unnecessarily limiting the capacity of the recording medium to record data.

Some data processing operations require that the data to be recorded is copied from one recording medium onto another recording medium. Such operations may, for example, be required to make an archive record or to provide a back up of data to be used at a plurality of different sites. A problem arises in the case of magnetic storage tapes because the data storage capacity of a tape may vary due to a number of factors, including the magnetic recording quality of the tape, and of the drive and a combination of the two. The nominal capacity of two tapes may be the same but they may actually vary in capacity by up to 5 to 10%.

This means that the ability to perform a tape to tape copying operation may be compromised if the source tape from which the data is to be copied is filled up to or close to its capacity. This is because the destination tape onto which the data is to be recorded may not have a capacity sufficient to receive all the data.

A prior solution to this problem has been to make the position at which the EWEOM is given to the host further removed from the real end of medium position on the tape. This only helps if the host performing the tape to tape copying operation continues recording on the target tape after the EWEOM has been reported to the host. This solution runs the risk that the real end of medium position will be encountered and at this point the copy operation will have failed.

Thus, a heretofore unaddressed need exists in the industry to address the aforementioned deficiencies and inadequacies.

SUMMARY

According to the present disclosure, there is now provided various embodiments of systems and methods of recording data in a sequence of data sets onto a data recording medium having a recording capacity up to an end of medium position. Briefly described, one embodiment of a method includes the following steps: deriving a logical count of the amount of data recorded on the recording medium, and comparing the logical count to a reference value to generate a warning of an approach to the end of medium position.

Embodiments of the present disclosure also provide systems for recording data in a sequence of data sets onto a data recording medium having a recording capacity up to an end of medium position. One embodiment of such a system includes an apparatus having counting logic to derive a logical count of the amount of data recorded on the recording medium, and comparing means to compare the logical count to a reference value so as to generate a warning of an approach to the end of medium position.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The present disclosure will now be described, by way of example only, with reference to the accompanying drawings in which.

DETAILED DESCRIPTION

Figure 1:
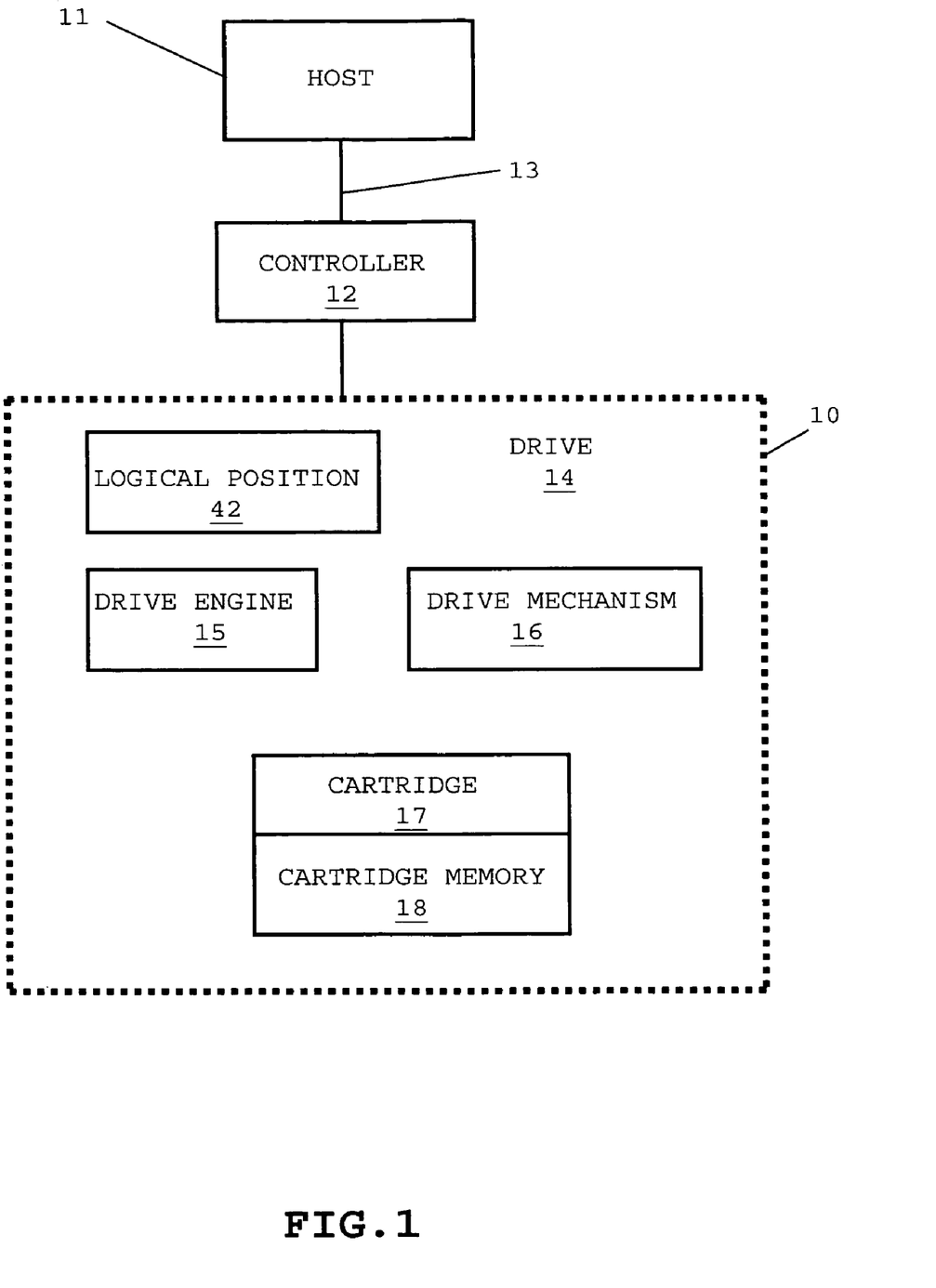
FIG. 1 is a block diagram of the hardware components and interconnections of a data storage system according to the present disclosure.

Referring to FIG. 1, there is shown a data storage apparatus incorporating a tape drive 10 and a controller 12 coupled to at least one hierarchically superior host 11. The controller 12 is connected to the host 11 by an interface 13. The tape drive 14 includes a drive engine 15 and a drive mechanism 16 that receives a tape cartridge 17 that has a cartridge memory 18. A controlling software application on the host 11 acts through the controller 12 to control the tape drive 14 to read data from and write data to the tape storage cartridge 15.

The host system 11 has at least one central processing unit (CPU) and a memory to store the controlling software application. The interface 13 connecting the host system 11 to the data storage apparatus 10 is, in some embodiments, a Small Computer Systems Interface (SCSI) or a USB (Universal Serial Bus). The method of communication over either of these standard busses is known to those skilled in the art.

The drive mechanism 16 includes electrical and mechanical components that receive, position, and access tape cartridges. The drive mechanism has components to lock a tape cartridge in place, an ejection motor, and read/write heads. The drive engine 15 is a data processor that is programmed to supervise the operation of the drive mechanism 16 and to manage the flow of data to be recorded in or read from a tape cartridge 17 received in the drive 14. A register 42 in the drive tape drive 14 holds an EWEOM reference value that represents a reference logical position along the tape at which an EWEOM is to be sent to the host 11 as will be described below.

Figure 2:
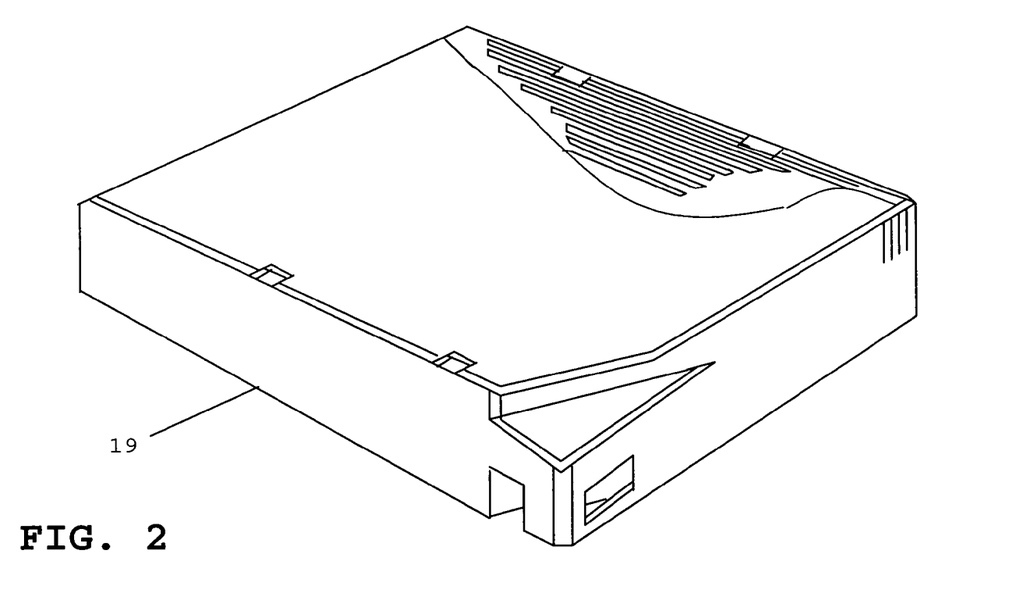
FIGS. 2 and 3 show a tape cartridge included in the system of FIG. 1.
Figure 3:
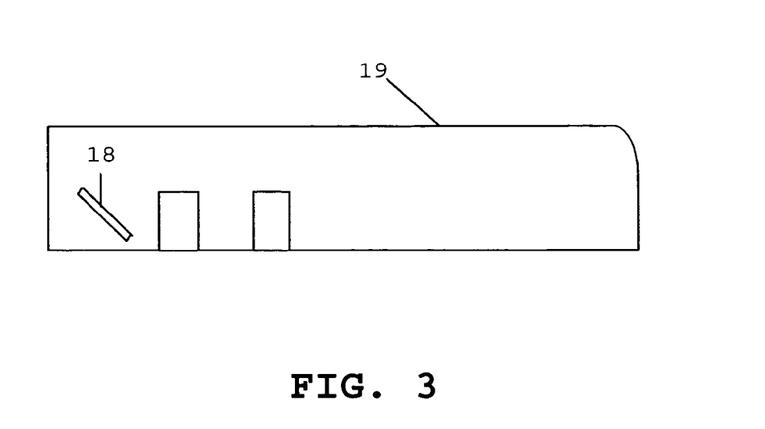

FIGS. 2 and 3, show a general view of the cartridge 17 including a structural casing 19 within which are located the cartridge memory 18 and a magnetically recordable tape. The cartridge is an implementation of Linear Tape Open (LTO) technology. The tape is supported on a rotatable tape reel or spool and has a leader by means of which the tape drive 14 can uncoil and withdraw the tape from the cartridge reel or spool for data reading or recording.

Figure 4:
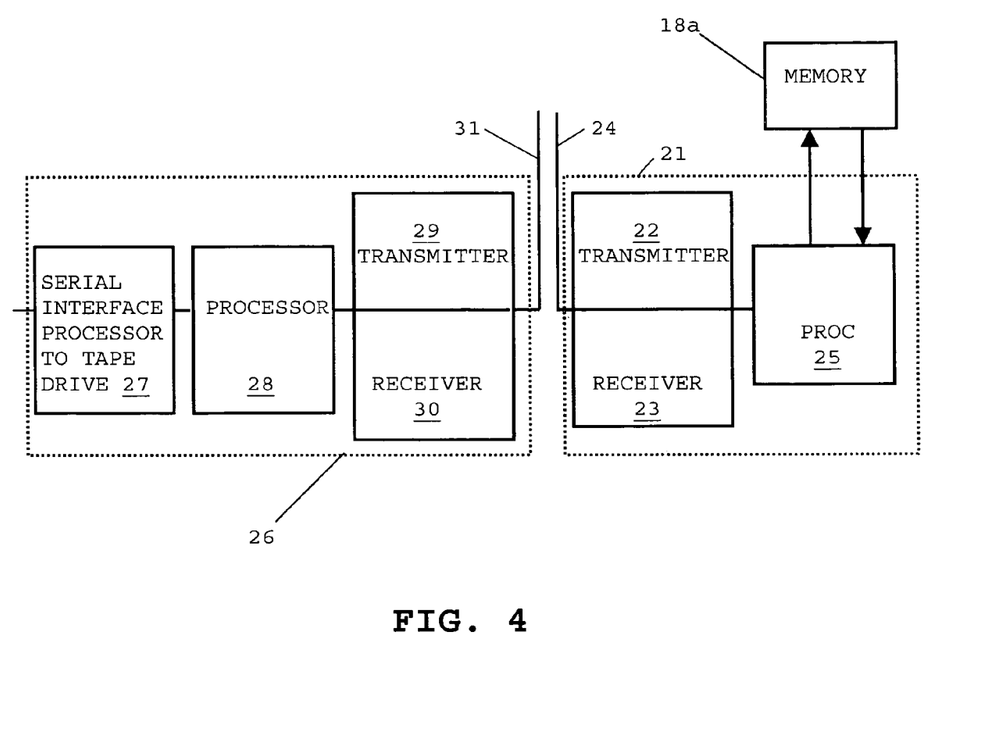
FIG. 4 is a block diagram of transponders and memory included in the data storage apparatus of FIG. 1, FIGS. 5, 6, 7 and 8 are diagrams of data recording on a tape included in the tape cartridge of FIGS. 2 and 3.

Referring to FIG. 4, the cartridge memory 18 includes a transponder 21 and a memory area 18a that has the capability of non-volatile storage and is, in some embodiments, an EEPROM (electronically erasable programmable read only device). The transponder 21 consists of a transmitter 22, a receiver 23, an aerial 24 and a processor 25. The cartridge memory 18 co-operates with a transmitter/receiver module 26 incorporated into the tape drive 14. The module 26 includes a serial interface 27 to the tape drive, a processor 28, a transmitter 29, a receiver 30 and an aerial 31. The transponder 21 incorporated into the cartridge 17 is inductively powered by the transmitter/receiver module 26 and data is exchanged between the transmitter/receiver 22, 23 of the transponder 21 and the transmitter/receiver 29, 30 of the module 26 by way of the inductively coupled aerials 24 and 31. The aerials 24 and 31 thus provide a contactless coupling of the cartridge memory 18 to the tape drive 14 for data transfer between the cartridge memory and the tape drive when the tape cartridge 17 has been received by the tape drive.

The cartridge memory area 18a stores information including usage information, cartridge manufacturer information, and cartridge memory manufacturer information. The cartridge manufacturer information includes the cartridge type, a serial number of the cartridge, and an identification of the manufacturer. The cartridge memory manufacturer information includes the serial number of the transponder, the type of transponder, and the serial number of the cartridge memory.

Figure 5:
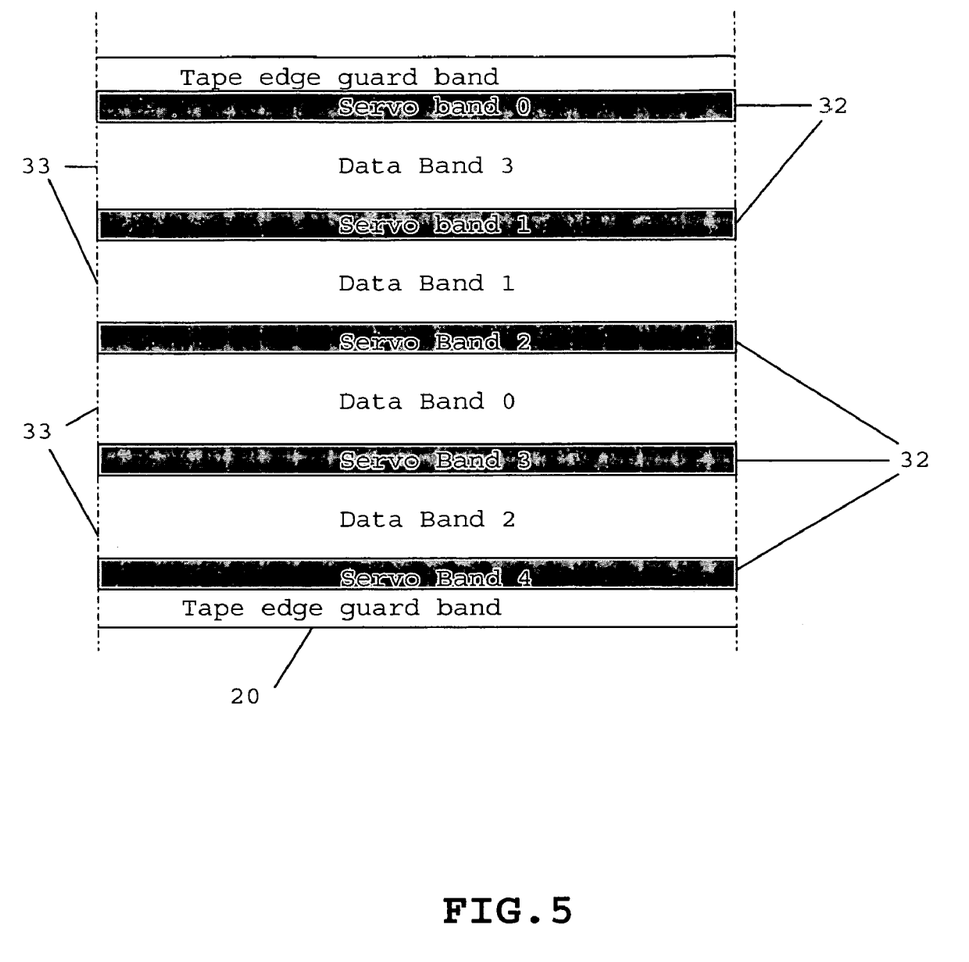
Figure 6:
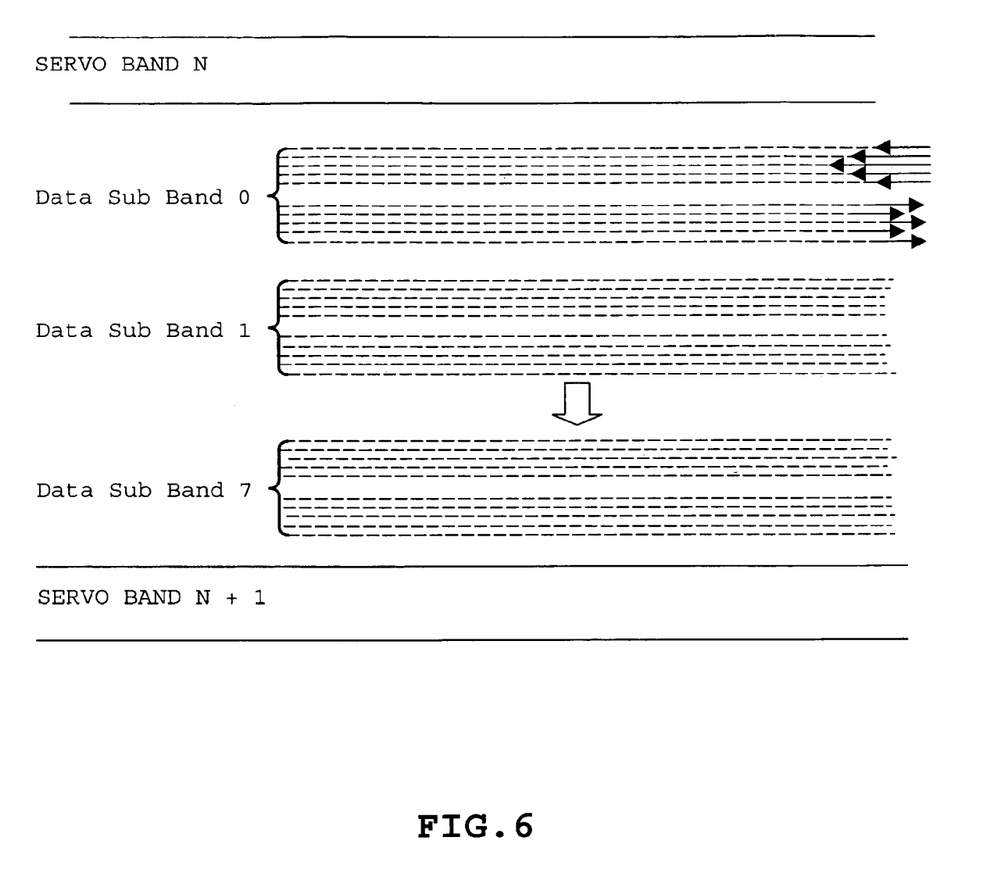

FIGS. 5 and 6 are diagrammatic representations of the manner in which data is recorded on the tape. Each of FIGS. 5 and 6 show a short portion only of the tape. There are five servo bands 32 pre-recorded on the tape that are used for track following while the cartridge is being operated in the cartridge drive 14. The servo bands are written before the cartridge is usable for data storage and are located at predefined specific distances from one edge of the tape that is referred to as the tape reference edge. Each servo band contains servo frames encoded as longitudinal position words to provide an indication of the position down the length of the tape. In an exemplary embodiment, the longitudinal position words each comprise 36 servo frames which increment in value as the tape is removed from the cartridge in the forward direction within a range from 0 to 7,529,535.

Each of the four areas between adjacent pairs of servo bands is a data band 33—the bands being numbered 2, 0, 1 and 3 respectively with data band 2 being nearest to the tape reference edge and data band 3 being furthest from the tape reference edge. The four data bands each have 128 data tracks arranged in eight data sub-band s as shown in FIG. 6. The 16 data tracks in a sub-band are accessed in a spiral manner in forward and reverse wraps. Forward wraps are recorded while the tape is moving from the beginning of the tape to the end of the tape and reverse wraps are recorded while the tape is moving from the end of the tape to the beginning of the tape. The end of medium position of the tape is the end of the last data sub-band 7 of the data band 3. An early warning of end of media (EWEOM) is provided to the host 11 on the approach to the end of medium position of the tape in the tape cartridge 17 as will be described below.

Figure 7:
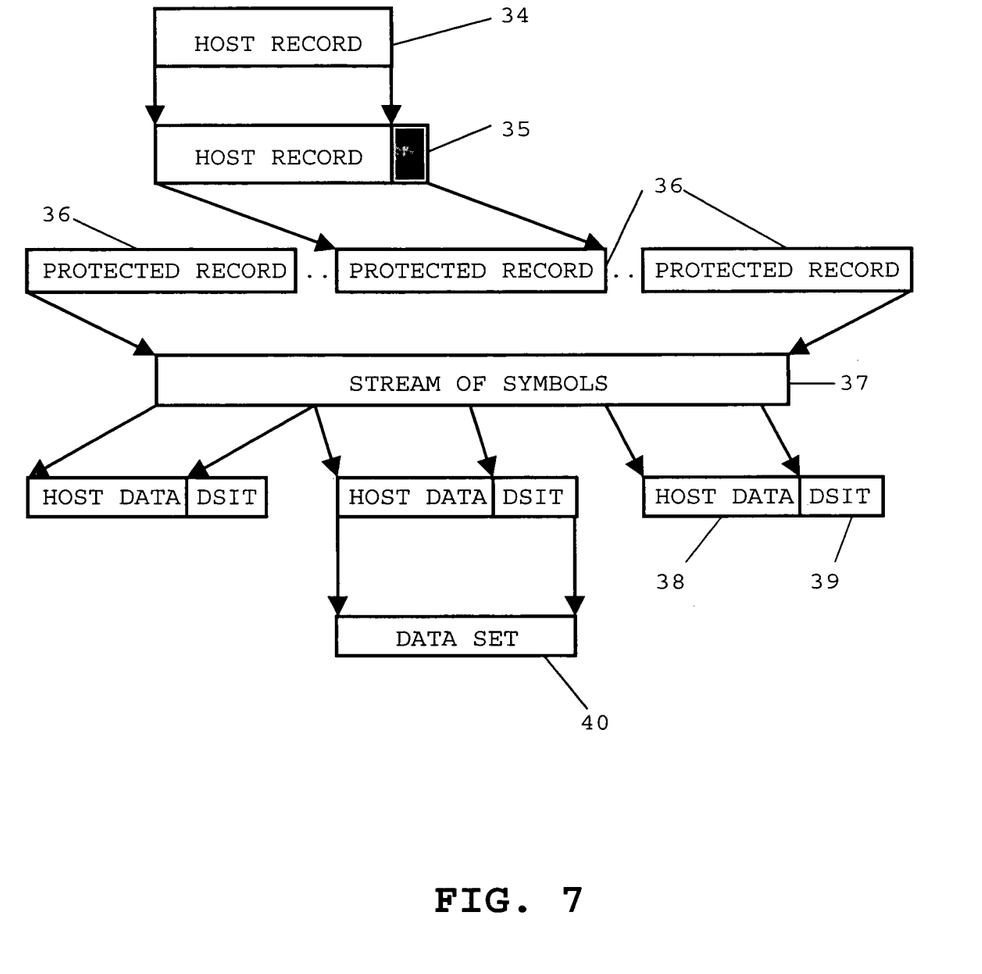

FIG. 7 shows the way in which data is transformed as it flows from the host 11 to the recorded tape. The data conforms to a data format in which data is logically divided into records 34 and file marks. Each record 34 is processed by the host to compute a cyclic redundancy check (CRC) character 35 that is added to the record to form a protected record 36. The CRC character is useful in the detection of errors. A data compression algorithm processes the protected records 36 and file marks to produce a stream of symbols 37 broken into sets of host data 38 to which a data set information table (DSIT) 39 is added. The host data and data set information table (DSIT) 39 together constitute a data set 40.

Figure 8:
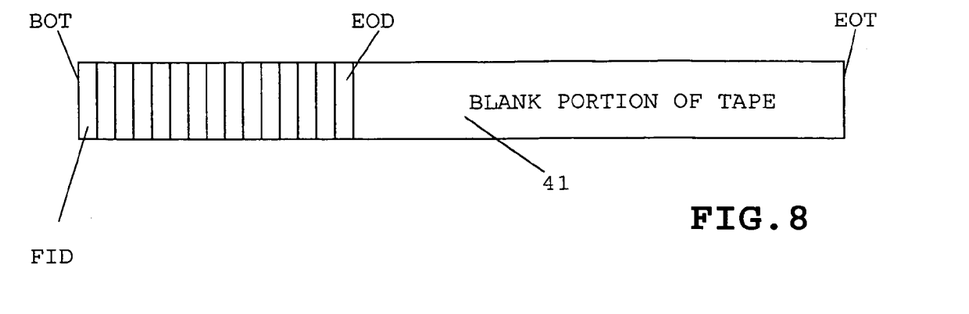

FIG. 8 shows the tape laid out in diagrammatic form from the beginning of the tape labelled BOT to the end of the tape labelled EOT. Data sets are recorded along the tape beginning with a format identification data set FID, followed by user data sets, and ending with an end of data set labelled EOD. A blank unrecorded portion 41 of the tape extends from the end of data set EOD to the end of the tape EOT. As will be appreciated, the end of tape EOT shown in FIG. 8 is reached at the end of the last data sub-band. An early warning of end of media (EWEOM) is provided to the host 11 if the length of the blank portion 41 of tape left between the end of data EOD and the end of tape EOT is reduced to a predetermined physical lower limit. At this point, the host 11 will terminate the recording operation. This position-based EWEOM is generated by means that sense the diameter of the tape in the cartridge 17 and, hence, how far the tape has advanced in the cartridge 17 during recording the last data sub-band. An alternative way of generating a position-based EWEOM is to detect pre-recorded data signifying the end of media at a prescribed position along the tape.

A recording session that depends solely on a position-based EWEOM suffers from the disadvantage that the provision of the EWEOM is at a fixed position relative to the end of the record. The position-based EWEOM thus provides no flexibility over the position along the tape at which the EWEOM is provided to the host. Data can be recorded on the tape in the tape cartridge 17 until the EWEOM is provided to the host 11.

The host 11 is able to control more than one tape drive so as to manage the flow of data to be copied from a source tape in one tape cartridge onto a destination tape in another tape cartridge. If the source tape is filled with data, then it is possible that the destination tape may not be able to accommodate all the data from the source tape. This is because the data storage capacity of the destination tape may be less than that of the source tape, even though the two tapes may have the same nominal capacity. The discrepancy results from the variable magnetic recording quality of the tape, and of the drive, and a combination of the two. The variation in capacity of a tape may be up to 5 to 10%.

To overcome these difficulties, an additional EWEOM is generated that is based on the amount of data that is recorded on the destination tape. A logical count of the amount of data is calculated in the tape drive 14 as the sum of records received from the host 11 from the start of the tape up to the current position. When each data set is filled, the drive puts the current count of records and file marks into the DSIT for the data set so that it is possible to identify a specific logical position from the DSIT. The logical count is registered in the cartridge memory 18 to indicate the logical position of the recording along the tape. When appending further data to the tape, the tape drive resumes the count from the logical position of the append point.

A register 42 in the drive tape drive 14 holds an EWEOM reference value that represents a reference logical position along the tape at which an EWEOM is to be sent to the host 11. The drive 14 is programmed to continuously compare the logical count representing the logical position from the start of the tape with the EWEOM reference value in the register 42. If the logical count reaches the same value as the EWEOM reference value, the drive 14 generates an EWEOM signal that is sent to the host 11. At that point the host 11 will terminate the recording operation.

The EWEOM reference value represents the amount of data that can be recorded on the destination tape before an EWEOM is generated. The tape drive is programmed to enter that value as a preliminary to the recording operation. The reference value, and therefore the amount of data that it represents, can be varied by program control according to the amount of data on the source tape and the expected capacity of the destination tape. As already explained, the capacity of the destination tape can vary depending on factors such as the recording quality of the destination tape. A degree of flexibility is thereby provided over when an EWEOM is generated to take account of the amount of data stored on the source tape and the capacity of the destination tape.

Figure 9:
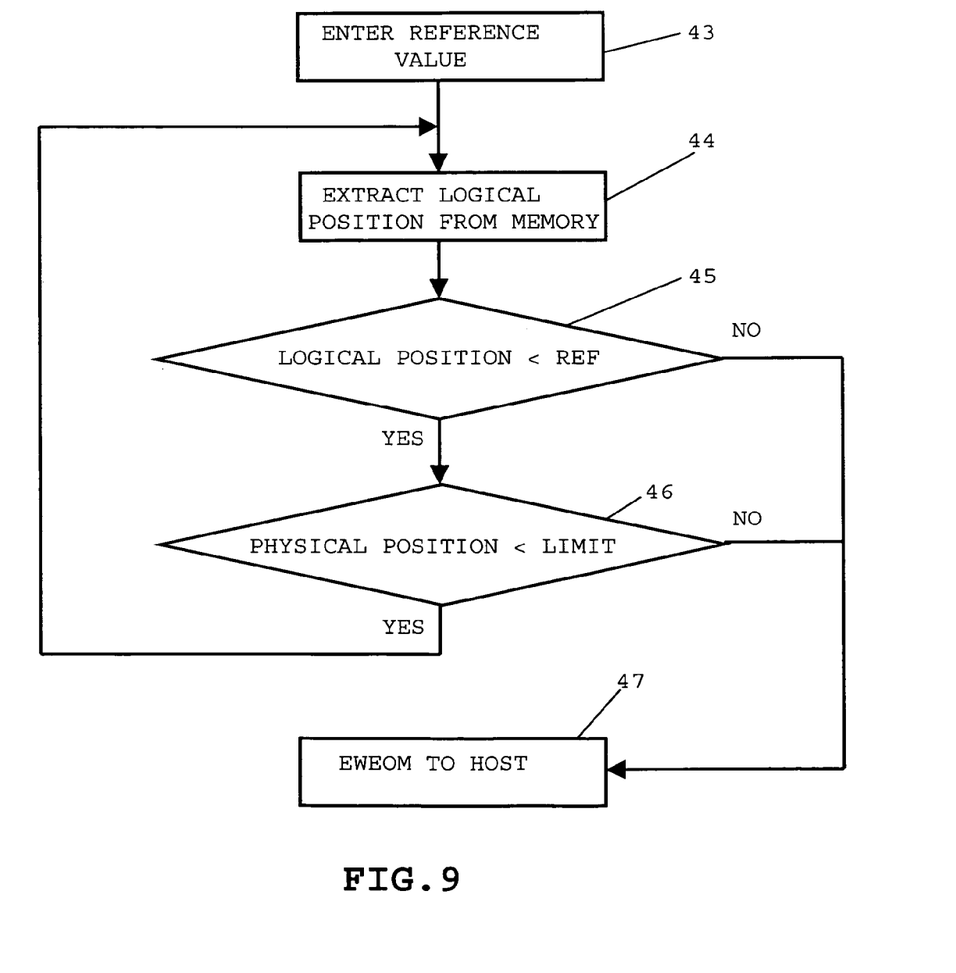
FIG. 9 is a flow diagram illustrating steps in a method embodying the present disclosure.

FIG. 9 illustrates the program routine for writing data to the tape. In a first step 43, the EWEOM reference value is entered into the register 42. In step 44, the count representing the current logical position is extracted from the cartridge memory 18 and compared in step 45 to check if the count is less than the reference value. If the result of the comparison is positive, the process continues to step 46. In the step 46, the length of blank tape is compared to the lower limit and if the comparison is positive, the process returns to step 44. If the result of the comparison is negative in step 45 or step 46, an EWEOM is returned to the host 11 and recording is terminated.

What has been described are systems and methods to record data keeping account, as the data is recorded, of the amount of data that has been recorded on the data recording medium, and providing a warning of the approach to the end of medium position when the amount of data that has been recorded reaches a predetermined amount. The determination of the amount of data is intended to provide an indication of the logical position along the tape up to which the recording has progressed. This determination may be made by reference to a count of the records that have been recorded. Alternatively, the determination may be made from the number of frames within the recording or by monitoring the amount of data that has been processed by the tape drive either before or after data compression.

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of this disclosure and protected by the following claims.

What is claimed is:

1. A method of recording data in a sequence of data sets onto a data recording medium having a recording capacity up to an end of medium position, the method comprising:

deriving a logical count of the amount of data recorded on the recording medium, and comparing the logical count to a reference value to generate a warning of an approach to the end of medium position.

2. A method as claimed in claim 1 in which the data is recorded on a data storage tape.

3. A method as claimed in claim 2, in which the data is recorded as a succession of data sets in data tracks accessed in a spiral manner in forward and reverse wraps, the forward wraps being recorded while moving the tape from the beginning of the tape to the end of the tape and the reverse wraps being recorded while moving the tape from the end of the tape to the beginning of the tape.

4. A method as claimed in claim 2, in which the tape is housed in a tape cartridge having a cartridge memory and the logical count is stored in the cartridge memory.

5. A method as claimed in claim 1, in which the data sets have data set information tables and the logical count is derived from the data set information tables of the data sets.

6. A method as claimed in claim 1, including the step of providing a further warning of the approach to the end of medium position when the unrecorded capacity of the recording medium reaches a lower prescribed limit.

7. A data recording apparatus for recording data in a sequence of data sets onto a data recording medium having a recording capacity up to an end of medium position, the apparatus comprising:

counting logic to derive a logical count of the amount of data recorded on the recording medium, and comparing means to compare the logical count to a reference value so as to generate a warning of an approach to the end of medium position.

8. Apparatus as claimed in claim 7, the apparatus adapted to record the data on a data storage tape.

9. Apparatus as claimed in claim 8, the apparatus adapted to record the data sets in data tracks accessible in a spiral manner in forward and reverse wraps, the forward wraps extending from a beginning of the tape to an end of the tape and the reverse wraps extending from the end of the tape to the beginning of the tape.

10. Apparatus as claimed in claim 8, in which the apparatus is adapted to record the data on a tape stored in a tape cartridge having a cartridge memory and the apparatus is programmed to store the logical count in the cartridge memory of the tape cartridge.

11. Apparatus as claimed in claim 7, in which the data sets have data set information tables and the counting logic derives the logical count from the data set information tables.

12. Apparatus as claimed in claim 7, including warning apparatus to provide a further warning of an approach to the end of medium position when the unrecorded capacity of the recording medium reaches a lower prescribed limit.

13. A method of copying data in a sequence of data sets from a first data recording medium onto a second data recording medium having a recording capacity up to an end of medium position, the method comprising:
deriving a logical count of the amount of data recorded on the second data recording medium, and
comparing the logical count to a reference value to generate a warning of an approach to the end of medium position of the second recording medium.

14. Apparatus for copying data in a sequence of data sets from a first data recording medium onto a second data recording medium having a recording capacity up to an end of medium position, the apparatus comprising:
counting logic to derive a logical count of the amount of data recorded on the second recording medium, and
comparing means to compare the logical count to a reference value so as to generate a warning of an approach to the end of medium position of the second recording medium.

15. A host computer system to control data recording apparatus for copying data in a sequence of data sets from a first data recording medium onto a second data recording medium, the host computer system being programmed to terminate the recording of data onto the second data recording medium in response to a warning from the data recording apparatus of the approach to an end of medium position of the said second recording medium when the recording has reached a reference position,
the host system being programmed to respond to a warning from the data recording apparatus generated from a logical count of the amount of data recorded on the second recording medium, the logical count having been calculated from the sum of data in the recorded data sets and being representative of the logical position reached by the recording.

16. A host computer system as claimed in claim 15, the system programmed to control an apparatus to record data on a data storage tape.

17. A host computer as claimed in claim 16, the computer programmed to control the apparatus in which the data is recorded in data sets in data tracks accessible in a spiral manner in forward and reverse wraps, the forward wraps extending from the beginning of the tape to the end of the tape and the reverse wraps extending from the end of the tape to the beginning of the tape.

18. A host computer system as claimed in claim 16, the computer programmed to control the apparatus adapted to record the data on a tape stored in a tape cartridge having a cartridge memory to store the logical position reached by the recording.

19. A host computer system as claimed in claim 15, programmed to control a data recording apparatus in which the data sets each have a data set information table and the logical position reached by the recording is derived from the data set information table of each data set.

20. A computer program embodied on a computer readable medium that, when loaded on a host system, is effective to cause the host system to control a data recording apparatus for copying data in a sequence of data sets from a first data recording medium onto a second data recording medium and to cause the host system to terminate the recording of data onto the second data recording medium in response to a warning from the data recording apparatus of the approach to an end of medium position of the said second recording medium, the program being effective to control the host system to respond to a warning from the data recording apparatus generated from a logical count of the amount of data recorded on the second recording medium, the logical count having been calculated from the sum of data in the recorded data sets and being representative of the logical position reached by the recording.

21. A method of recording data in a sequence of data sets onto a data storage tape having a recording capacity up to an end of tape position, the data sets having data set information tables representing the amounts of data in the data sets, the method comprising:
deriving from the data set information tables a logical count of the amount of data recorded on the data storage tape, and
comparing the logical count to a reference value to generate a warning of an approach to the end of tape position.

22. Apparatus for recording data in a sequence of data sets onto a data storage tape having a recording capacity up to an end of tape position, the data sets having data set information tables representing the amounts of data in the data sets, the apparatus comprising:
counting logic to derive from the data set information tables a logical count of the amount of data recorded on the data storage tape, and
comparing means to compare the logical count to a reference value to generate a warning of an approach to the end of tape position.

* * * * *